(12) United States Patent
Ichimura et al.

(10) Patent No.: US 6,292,453 B1
(45) Date of Patent: Sep. 18, 2001

(54) OPTICAL DISC RECORDING/REPRODUCTION APPARATUS HAVING A LENS GROUP, FOCUS, SERVO, AND JOG MODE ADJUSTMENT

(75) Inventors: Isao Ichimura, Kanagawa; Fumisada Maeda; Kenji Yamamoto, both of Tokyo; Kiyoshi Ohsato, Chiba; Toshio Watanabe; Akira Suzuki, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/994,454

(22) Filed: Dec. 19, 1997

(30) Foreign Application Priority Data

Dec. 20, 1996 (JP) .................................... 8-340903

(51) Int. Cl.$^7$ ........................................ G11B 7/00
(52) U.S. Cl. .................... 369/112.24; 369/44.23
(58) Field of Search .................... 369/103, 109, 369/110, 112, 44.23, 44.24

(56) References Cited

U.S. PATENT DOCUMENTS

| | | | |
|---|---|---|---|
| 5,526,336 | * 6/1996 | Park et al. | 369/112 |
| 5,689,480 | * 11/1997 | Kino | 369/112 |
| 5,691,971 | * 11/1997 | Kim | 369/112 |
| 5,712,842 | * 1/1998 | Yamamoto et al. | 369/110 |
| 5,764,613 | * 6/1998 | Yamamoto et al. | 369/112 |
| 5,828,635 | * 10/1998 | Choi | 369/44.14 |
| 5,889,749 | * 2/1999 | Katsums et al. | 369/112 |
| 6,005,834 | * 12/1999 | Maeda et al. | 369/112 |

* cited by examiner

Primary Examiner—Nabil Hindl
(74) Attorney, Agent, or Firm—Ronald P. Kananen; Rader, Fishman & Grauer

(57) ABSTRACT

The present invention provides an optical disc recording/reproduction apparatus and method capable of carrying out an accurate recording or reproduction when using a lens unit consisting of at least two lenses, which comprises: first drive means for driving both of the first lenses and the second lens in a focusing direction; second drive means for relatively driving the second lens with respect to the first lens in the focusing direction; focus servo means for carrying out focus servo by driving the first drive means so as to drive both of the first lens and the second lens in the focusing direction; and jog mode adjustment means for driving the second drive means after the focus servo is locked, so as to carry out a jog mode adjustment of the position of the second lens with respect to the first lens.

16 Claims, 13 Drawing Sheets

FOCUS ERROR SIGNAL
(A+C) − (B+D)

TRACKING ERROR SIGNAL
(A+D)−(B+C)+k[(E−F)+(G−H)]

FIG.7A FE (FOCUS ERROR)

FIG.7B SUM — DETECTION LEVEL

FIG.7C FOCUS ON GATE

OPTICAL DISC RECORDING/REPRODUCTION APPARATUS HAVING A LENS GROUP, FOCUS, SERVO, AND JOG MODE ADJUSTMENT

BACKGROUND OF THE INVENTION

1. Field of the Invention

The present invention relates to an optical disc recording/reproduction apparatus and method and in particular, to an optical disc recording/reproduction apparatus and method using two groups of lenses enabling to accurately recording and reproducing a data.

2. Description of the Prior Art

The most widely known disc as an optical disc is a CD (Compact Disc). As the CD has a large recording capacity, it is now spreading as a medium for providing a computer program and data, including CD-ROM.

As an optical disc capable of recording or reproducing a data with a higher density than this CD, a DVD (Digital Versatile Disc) has been developed and normalized.

In general, when a disc recording capacity is made to have a high density, it is necessary to make larger a numerical aperture of a pickup lens used for recording or reproducing a data. That is, in order to increase a recording density, it is necessary to reduce the size of an optical spot as much as possible. A size of an optical sport formed on an optical disc is defined as L/2NA, assuming L to be a wavelength and NA to be a numerical aperture of the lens. Consequently, in order to increase a recording density, it is necessary either decrease the wavelength or increase the numerical aperture NA of the lens.

For example, because a DVD has a higher recording density than a CD, reproduction of the DVD requires a lens numerical aperture of about 0.6 in comparison to about 0.43 required for reproduction of the CD.

It is expected that the optical disc can have a further higher density than the DVD. For this, the lens numerical aperture should be a further greater value. However, the maximum numerical aperture which can be realized by a single lens is considered to be 0.6 because of the processing accuracy.

To cope with this, U.S. Pat. No. 5,125,750 discloses a solid immersion lens (SIL) to be used in combination with an objective lens, as a two-lens group, so as to realize a greater numerical aperture.

When this two-lens group is used for realizing a high numerical aperture, there is a problem that as the light coming out of the SIL enters an optical disc with a great angle, if a distance between the two lenses is deviated from a predetermined value, a wave front aberration is caused and it becomes difficult to carry out an accurate data recording or reproduction.

SUMMARY OF THE INVENTION

It is therefore an object of the present invention to enable to carry out an accurate data recording or reproduction when using a lens unit consisting of at least two lenses.

An optical disc recording/reproduction apparatus claimed in claim 1 comprises: first drive means for driving both of the first lens and the second lens in a focusing direction; second drive means for relatively driving the second lens with respect to the first lens in the focusing direction; focus servo means for carrying out focus servo by driving the first drive means so as to drive both of the first lens and the second lens in the focusing direction; and jog mode adjustment means for driving the second drive means after the focus servo is locked, so as to carry out a jog mode adjustment of the position of the second lens with respect to the first lens.

An optical disc recording/reproduction method claimed in claim 14 is characterized by a focus servo step for driving both of the first lens and the second lens in a focusing direction for carrying out a focus servo; and a jog mode adjustment step, after the focus servo is locked, for carrying out a jog mode adjustment of a position of the second lens with respect to the first lens.

In the optical disc recording/reproduction apparatus claimed in claim 1 and the optical disc recording/reproduction method claimed in claim 14, the focus servo is locked before carrying out the jog mode adjustment of the position of the second lens with respect to the first lens. Consequently, it is possible to accurately record or reproduce a data.

DETAILED DESCRIPTION OF THE PREFERRED EMBODIMENTS

Description will now be directed o embodiments of the present invention with reference to the attached drawings.

Figure 1:
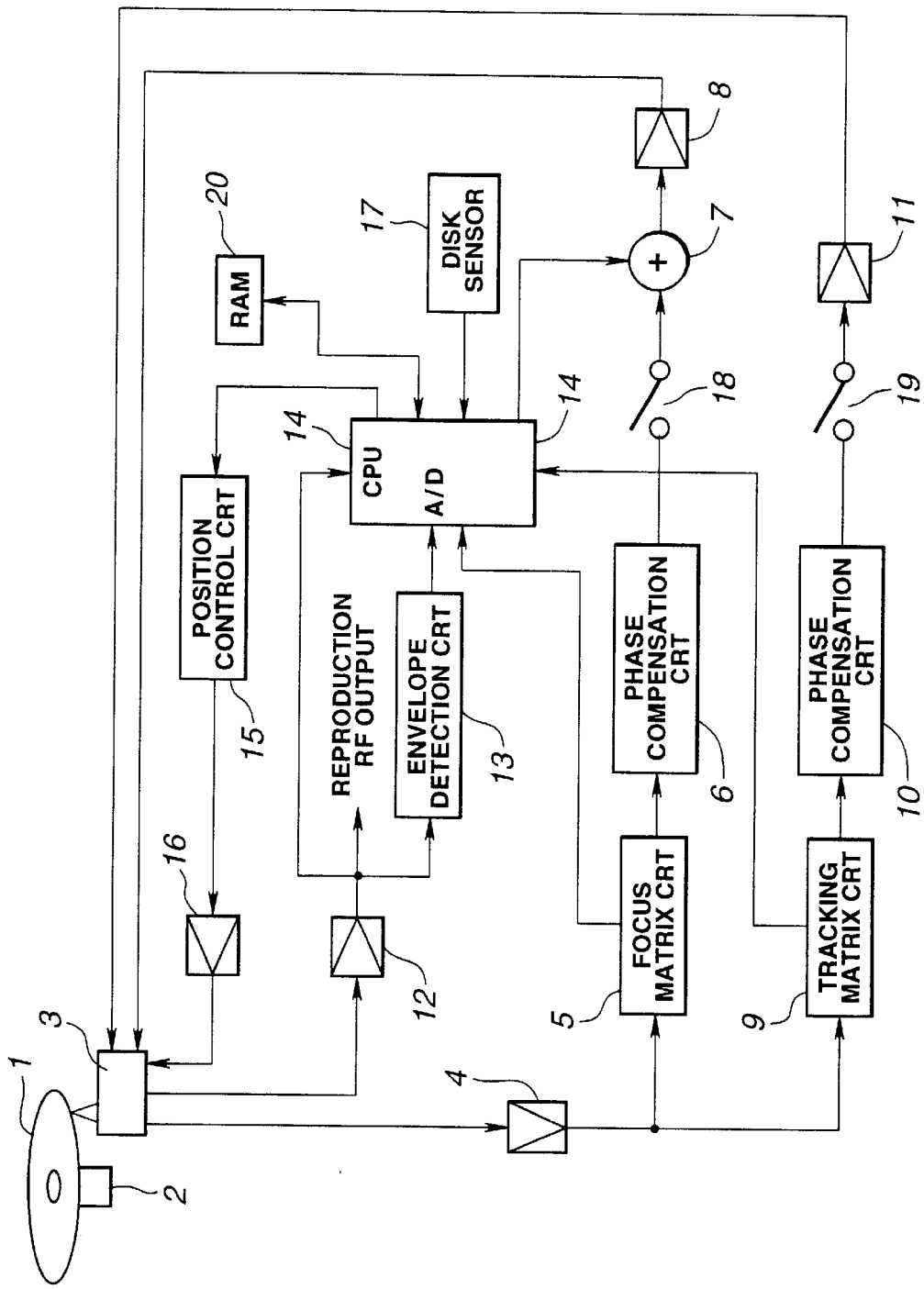
FIG. 1 is a block diagram showing an example of configuration of an optical disc recording/reproduction apparatus according to the present invention.

FIG. 1 is a block diagram showing an example of configuration of an optical disc recording/reproduction apparatus according to the present invention. An optical disc 1 is rotated by a spindle motor 2 at a predetermined velocity. A pickup 3 applies a laser beam to the optical disc 1 so as to record a data as well as to reproduce a data from the optical disc 1. A servo head amplifier 4 amplifies a servo signal outputted from the pickup 3, for supply to a focus matrix circuit 5 and a tracking matrix circuit 9. The focus matrix circuit 5 generates a focus error signal, for example, according to the astigmatic method, and outputs it to a phase compensation circuit 6. The phase compensation circuit 6 carries out a phase compensation to the focus error signal supplied and output the resultant signal via a loop switch 18 and an adder 7 to an amplifier 8. The amplifier 8 amplifies the focus error signal supplied and outputs the resultant signal to the pickup 3.

The tracking matrix circuit 9 generates a tracking error signal, for example, according to the differential push-pull (DPP) method. A phase compensation circuit 10 carries out a phase compensation to the tracking error signal supplied from the tracking matrix circuit 9 and outputs the resultant signal via a loop switch 19 to an amplifier 11. The amplifier 11 amplifies the tracking error signal supplied and outputs the resultant signal to the pickup 3.

On the other hand, a reproduction RF signal outputted from the pickup 3 is amplified by an RF head amplifier 12 and outputted to a circuit (not depicted) and partially to an envelope detection circuit 13 for detection of an envelope. The envelope detection circuit 13 outputs a signal which is supplied to a CPU 14. In response to the output of the envelope detection circuit 13, the CPU 14 controls a position control circuit 15 so as to generate a control signal for controlling a relative position of a forward lens 28 constituting the pickup 3 and facing the optical disc, with respect to a lens 27 (which will be detailed later with reference to FIG. 2) in a focusing direction. The position control signal outputted from the position control circuit 15 is outputted via an amplifier 16 to the pickup 3. The CPU 14 read out a data such as a type of the optical disc 1 and a number of recording layers.

A disc sensor 17 detects whether a disc is present, identifies a type of the disc when a plurality of disc types are available, and outputs the identification result to the CPU 14. The CPU 14 generates a drive signal or a jump pulse for supply to the adder 7 when activating the focus servo or executing a focus jump. A RAM 20 stores a data which corresponds to a position of the forward lens 28.

Figure 2:
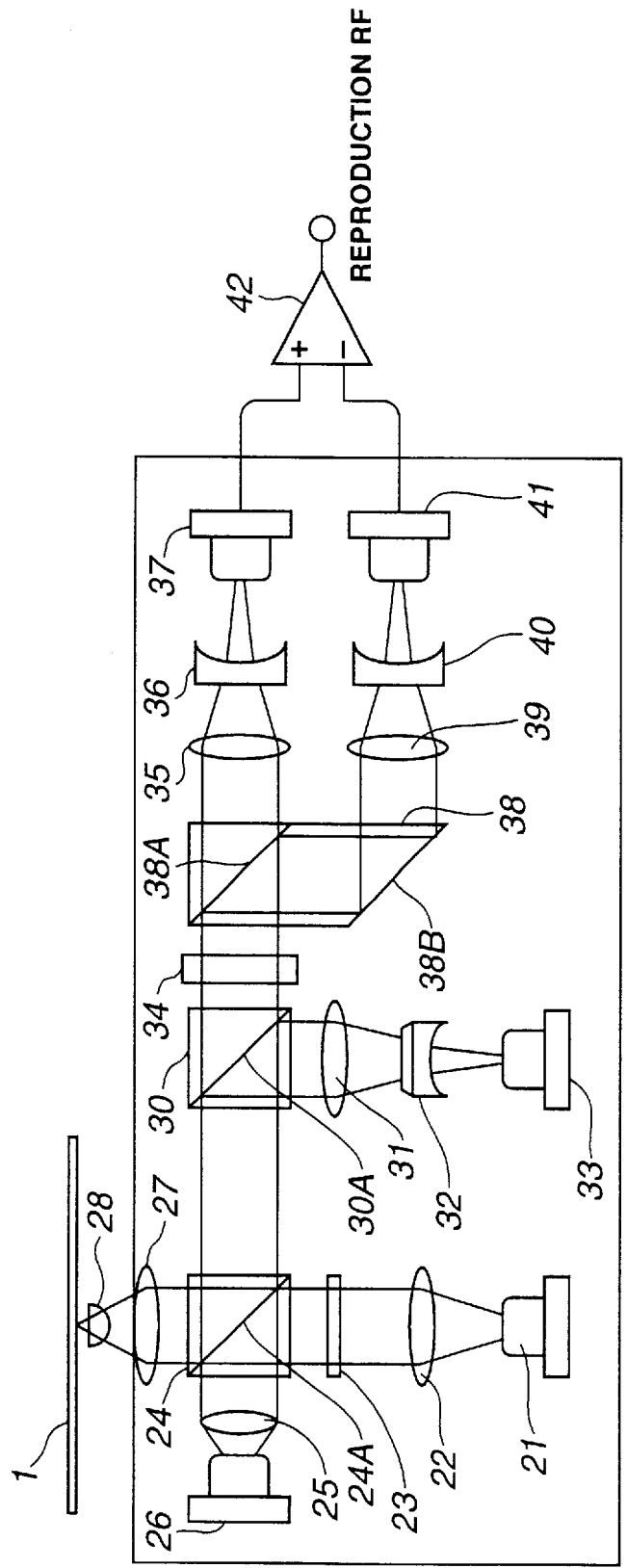
FIG. 2 shows an example of configuration of the pickup 3 shown in FIG. 1.

FIG. 2 shows a detailed configuration of the pickup 3. A laser diode 21 emits a laser beam of, for example, 680 nm wavelength. Collimator lens 22 converts divergent rays emitted from the laser diode 21, into parallel rays. A grating 23 divides the laser beam emitted from the collimator lens 22, into three laser beams. The laser beam from the grating 23 is introduced into a beam splitter 24, where a portion of the beam is reflected by a reflection plane 24A and introduced by a convex lens 25 to a photo detector 26 for auto power control (APC).

On the other hand, the portion of the laser beam which has passed through the reflection plane 24A is made into a converged beam by the lens 27 and applied via the forward lens 28 to the optical disc 1.

The laser beam reflected by the optical disc 1 is introduced via the forward lens 28 and the lens 27 to the beam splitter 24, where the reflection plane 24A reflects a portion (for example, 30%) of the p-polarized component and the entire s-polarized component, which are introduced to a beam splitter 30. The laser beam which has entered the beam splitter 30 is partially reflected by a reflection plane 30A to be converged by a convex lens 31 and is given an astigmatism by a cylindrical lens 32 before introduced to a photo diode 33 for a servo signal.

On the other hand, the laser beam portion which has passed through the reflection plane 30A of the beam splitter 30 is introduced via a half-wave plate 34 for adjusting a beam balance, to a polarization beam splitter 38.

When the laser beam has entered the polarization beam splitter 38, a p-polarized component passes through a reflection plane 38A and is converted by a convex lens 35 so as to be introduced via a concave lens 36 to a photo detector 37. On the other hand, an s-polarized component of the laser beam which has entered the polarization beam splitter 38 is reflected by the reflection plane 38A and further by a reflection plane 38B and converted by a convex lens 39 so as to be introduced via a concave lens 40 to a photo detector 41. A differential amplifier 42 calculates a difference between outputs of the photo detector 37 and the photo detector 41 and outputs the result as a reproduction RF signal.

In a reproduction mode, a laser beam emitted from the laser diode 21 is converted into parallel rays by the collimator lens 22, divided into three laser beams by the grating 23, and introduced via the beam splitter 24 to the lens 27. The laser beam focused by the lens 27 is applied via the forward lens 28 to the optical disc 1.

In this case, a portion of the laser beam reaching the optical disc 1 is reflected by the reflection plane 24A of the beam splitter 24 and introduced via the convex lens 25 to the photo detector 26. The laser diode 21 is controlled in its power so that an output of the photo detector 26 has a predetermined reference level.

Figure 3:
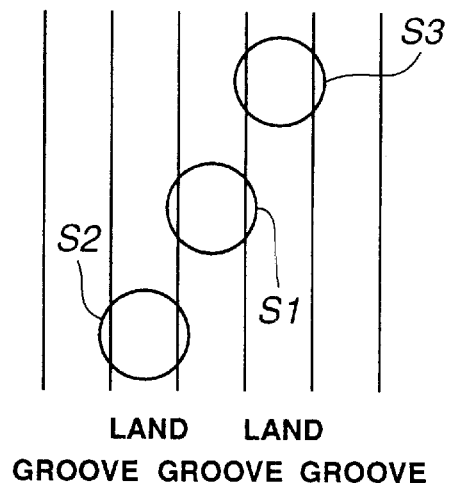
FIG. 3 explains a spot position on an optical disc.

As shown in FIG. 3, on the optical disc 1, one of the three laser beams divided by the grating 23, i.e., the center laser beam forms an optical spot S1 on a groove (track) where a data is to be recorded or from where a data is to be reproduced, whereas the laser beams sandwiching the center beam form an optical spot S2 and an optical spot S3 on a land left to and right to the optical spot S1.

The beam reflected from these optical spots S1, S2, and S3 is introduced via the forward lens 28 and the lens 27 to the beam splitter 24, where the beam is reflected by the reflection plane 24A. The laser beam reflected by the reflection plane 24A is introduced into the beam splitter 30, where a portion of the beam is reflected by the reflection plane 30A. The laser beam reflected by the reflection plane 30A is introduced via the convex lens 31 to the cylindrical lens 32, and after given an astigmatism, introduced to the photo diode 33.

Figure 4:
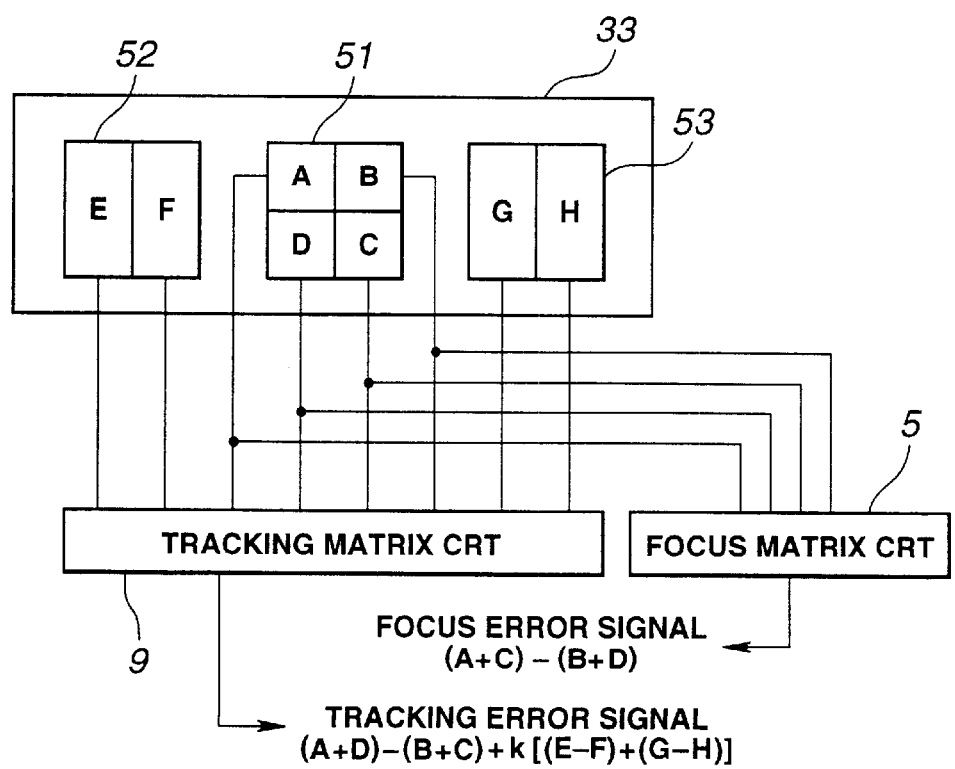
FIG. 4 explains processing carried out by a first focus matrix circuit 5 and a tracking matrix circuit 9.

As shown in FIG. 4, the photo diode 33 includes a photo diode 51 for receiving a beam reflected from the optical spot S1 and a photo diode 52 or 53 arranged so as to sandwich the photo diode 51, for receiving a beam reflected from the optical spot S2 or S3. The photo diode 51 is divided into four regions A to D formed in a track direction and a direction vertical to the track direction. Each of the photo diodes 52 and 53 is divided into two regions E and F or G and H in the track direction.

The focus matrix circuit 5 is supplied with outputs from the regions A to D of the photo detector 51 and carries out the following calculation so as to generate a focus error signal F.

$$F=(A+C)-(B+D)$$

On the other hand, the tracking matrix circuit 9 obtains a tracking error signal by the DPP method and uses outputs from the regions A to H of the photo diodes 51 to 53 for carrying out the following calculation so as to generate a tracking error signal T.

$$T=(A+D)-(B+C)+k[(E-F)+((G-H)]$$

Most of the beam which has entered the beam splitter 30 passes through the reflection plane 30A and is introduced via the half-wave plate 34 to the polarization beam splitter 38. From this beam, a p-polarized component is introduced via the convex lens 35 and the concave lens 36 to the photo detector 37, whereas an s-polarized component is reflected by the reflection plane 38A and 38B and introduced via the convex lens 39 and the concave lens 40 to the photo detector 41. The differential amplifier 42 calculates a difference between the p-polarized component outputted from the photo detector 37 and the output signal component of the photo detector 41 and outputs the result as a reproduction RF signal.

Figure 5:
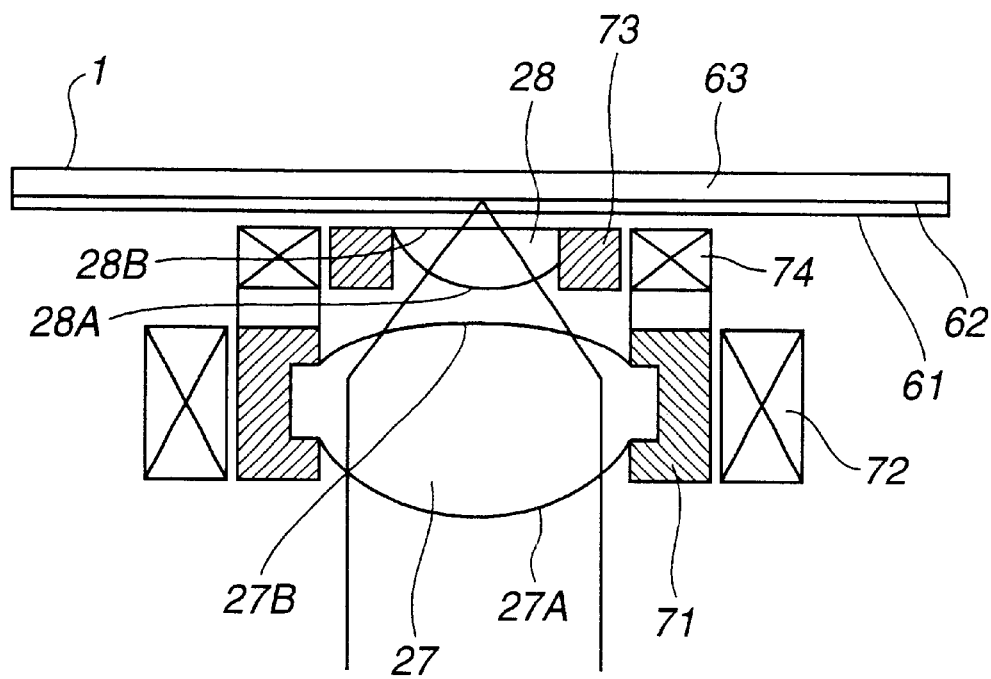
FIG. 5 shows a detailed configuration of a movable portion of the pickup 3 of FIG. 2.

FIG. 5 shows a further detailed configuration of a movable portion of the pickup 3. A lens holder 71 holds the lens 27 and is provided with an actuator 72 on its outer circumference. Next to the lens holder 71 is provided a lens holder 73 facing the optical disc 1, via an actuator 74. The lens holder 73 holds the forward lens 28. The actuator 74 drives the lens holder 73 (i.e., the forward lens 28) in a focusing direction with respect to the lens holder 71 (i.e., the lens 27). The actuator 72 drives in the focusing direction and the tracking direction the lens holder 71 (the lens 27) together with the lens holder 73 (the forward lens 28) attached to the lens holder 71 via the actuator 74.

The lens 27 has a numerical aperture of about 0.45. Because this lens 27 is to be used in combination with the forward lens 28, the numerical aperture of the incident is multiplied by about 1.8 and the lens unit consisting of the lens 27 and the forward lens 28 exhibits a numerical aperture as high as about 0.8 to 0.9. It should be noted that a distance between the forward lens 28 and a cover layer 61 of the optical disc 1 is equal to or less than 500 $\mu$m because of the problem of processing accuracy of a lens of a high numerical aperture.

When recording or reproducing a data to/from the optical disc 1 by using a lens unit (lens group) of a high numerical aperture, if a substrate has a large thickness, as described above, the allowance for a frame aberration caused by the inclination of the optical disc 1 is remarkably lowered. That is, as shown in FIG. 5, the optical disc 1 is formed from a substrate 63 on which a data recording layer 62 is formed, which is covered by a cover glass 61 (or a material other than glass such as a polycarbonate). The laser beam is applied through the cover glass 61 to the recording layer 62. Here, in this embodiment, the cover glass 61 has a thickness of 0.1 mm. Thus, the cover glass 61 has a thinner thickness than a DVD (having a thickness of 0.6 mm), so as to reduce affect of a frame aberration on disc skew even when a lens unit of a high numerical aperture is used.

Figure 6:
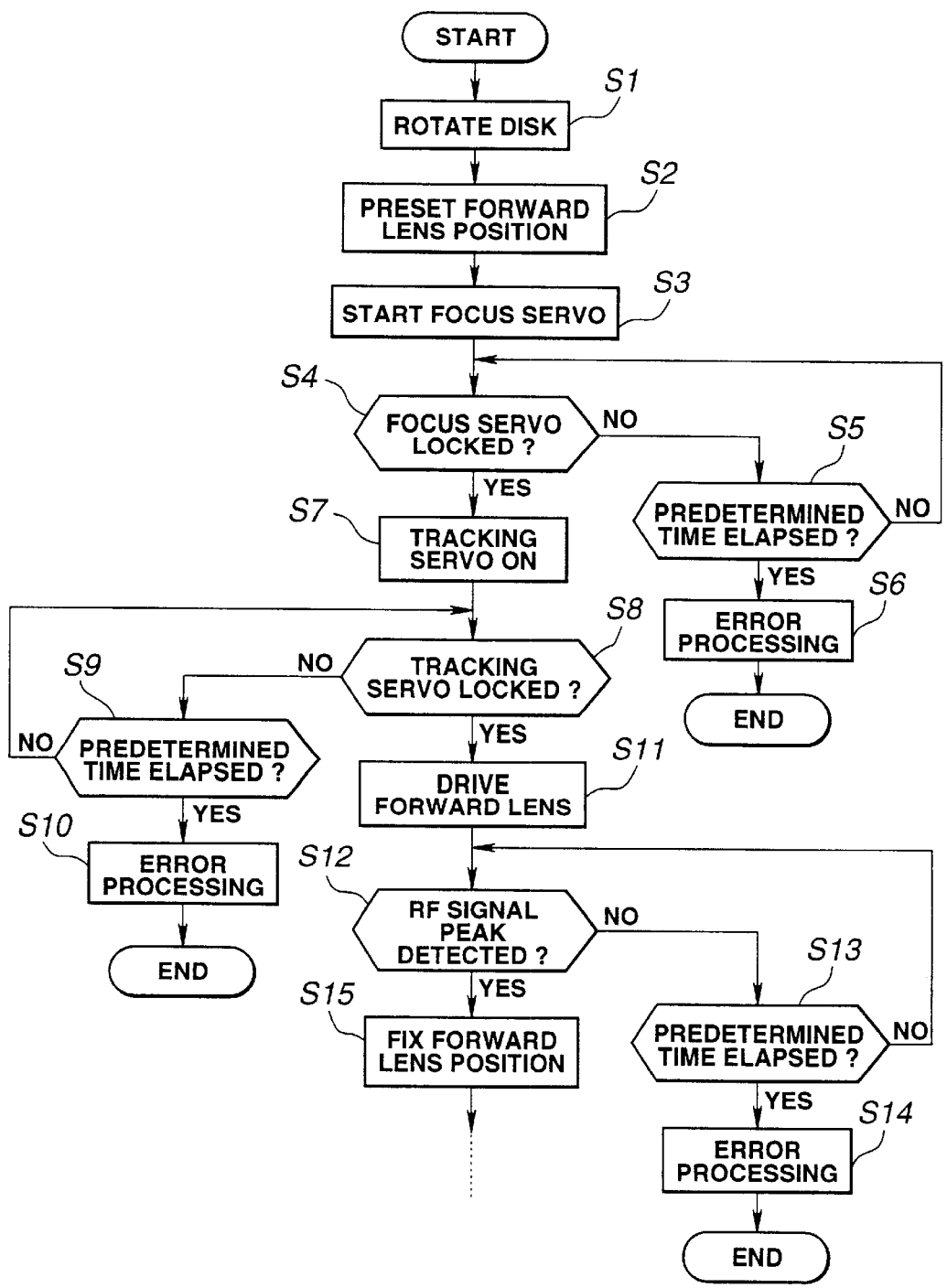
FIG. 6 is a flowchart showing an operation carried out when the optical disc recording/reproduction apparatus of FIG. 1 is started.

FIG. 6 is a flowchart showing an operation carried out when the optical disc recording/reproduction apparatus shown in FIG. 1 is started. The processing of the flowchart of FIG. 6 is started when the optical disc 1 is mounted on the recording/reproduction apparatus. That is, when the optical disc 1 is mounted and the disc mounting is detected by the disc sensor 17, the CPU 14 start the processing shown in the flowchart of FIG. 6.

Firstly, in step S1, the CPU 14 controls the spindle motor 2 so as to rotate the optical disc 1 at a predetermined velocity. Then, control is passed to step S2, where the CPU 14 control the position control circuit 15 so as to generate a control signal for setting the forward lens 28 at a predetermined default position with respect to the lens 27. The data corresponding to this default position is written in a program processed by the CPU 14. This control signal is supplied via the amplifier 16 to the actuator 74 of the pickup 3. Thus, the relative position of the forward lens 38 in relation to the lens 27 is set (fixed) to the default value.

Control is passed to step S3, where the CPU 14 starts the focus servo. That is, the CPU 14 generates a start signal for shifting the lens 27 from the farthest position from the optical disc 1 (lower position in FIG. 5) toward the optical disc 1 while keeping the loop switch 18 OFF. This start signal is supplied from the adder 7 to the amplifier 9 and, after being amplified, supplied to the actuator 72. Thus, the lens 27 and the forward lens 28 is shifted as a unitary block toward the optical disc 1.

The focus matrix circuit 5 executes the aforementioned calculation for signals outputted via the servo head amplifier 4 from the regions A to D of the photo diode 51, so as to generate a focus error signal FE.

Figure 7:
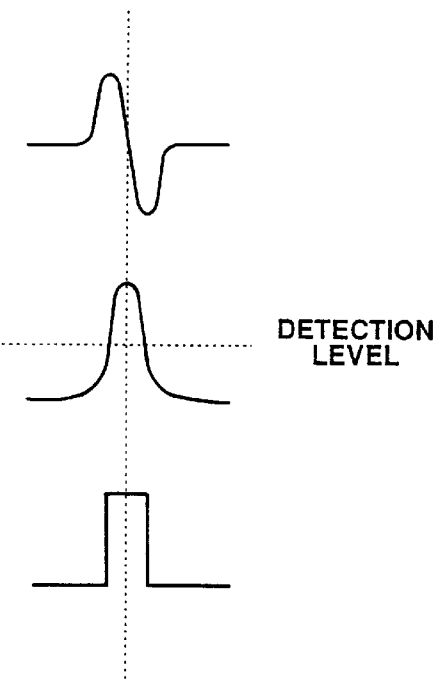
FIG. 7 explains a signal waveform when a focus servo is actuated in a case of an optical disc having a single recording layer.

This focus error signal shows an S-shaped characteristic as shown in FIG. 7A as the lens 27 and the forward lens 28 (the two-lens unit) approaches the optical disc 1. Moreover, the focus matrix circuit 5 adds the outputs from the regions A to D of the photo diode 51, so as to generate a signal SUM as follows.

$$SUM=A+B+C+D$$

As shown in FIG. 7B, this signal SUM has its maximum value in the vicinity of the focus position (zero cross position of the focus error signal). The focus matrix circuit 5 compares this signal SUM to a predetermined detection level which has been set in advance. When the signal SUM has become greater than the detection level, the focus matrix circuit 5 generates a gate signal shown in FIG. 7C for supply to the CPU 14. The CPU 14, upon reception of this gate signal, stops supply of the drive signal and turns on the loop switch 18.

When the loop switch 18 is turned on, the focus error signal generated by the focus matrix circuit 5 is subjected to a phase compensation in the phase compensation circuit 6 and supplied via the loop switch 18, the adder 7, and the amplifier 8 to the actuator 72. As a result, a focus servo loop is formed and the focus servo is locked unless an abnormal condition is detected.

In step S4, the CPU 14 determines whether the focus servo has been locked. If the focus servo is not locked, control is passed to step S5, it is determined whether a predetermined period of time has elapsed after the focus servo was started. If the period of time has not yet elapsed, control is returned to step S4 so as to repeat the processes of steps S4 and S5.

If it is detected in step S5 that the predetermined period of time has elapsed, control is passed to step S6, where, assuming that an error has been caused, an error processing is executed so as to terminate the start processing.

In step S4, a focus servo locked state can be detected by monitoring the focus error signal and the SUM signal outputted from the focus matrix circuit 5. That is, when the focus servo is locked, the level of the focus error signal is sufficiently reduced and the value of the SUM signal exceeds a predetermined reference value. Consequently, by detecting whether the level of the focus error signal is within a predetermined level range, it is possible to determine whether the focus servo has been locked.

If it is determined in step S4 that the focus servo is locked, control is passed to step S7, where the CPU 14 turns on the tracking servo.

That is, the CPU 14 monitors the level of the focus error signal outputted from the tracking matrix circuit 9 and turns on the loop switch 19 of the tracking servo loop at the timing when the level zero-crosses. As a result, the tracking error signal generated in the tracking matrix circuit 9 is phase-compensated in the phase compensation circuit 10 and supplied via the loop switch 19 and the amplifier 11 to the actuator 72, thus, controlling the two-lens unit.

Next, control is passed to step S8, where the CPU 14 determines whether the tracking servo is locked. This can be detected by monitoring the level of the tracking error signal. That is, when the tracking servo is locked, the level of the tracking error signal becomes a sufficiently small value. So, by monitoring whether the level of the tracking error signal is within a predetermined small level, it is possible to determine whether the tracking servo is locked.

If it is determined in step S8 that the tracking servo is not locked, control is passed to step S9, where it is determined whether a predetermined period of time has elapsed after the tracking servo is turned on. If the predetermined period of time has not passed, control is returned to step S8 to repeat the processes of the steps S8 and S9.

If it is determined in step S9 that the predetermined period of time has elapsed, it is assumed that an error is caused and control is passed to step S10 for executing an error processing.

Figure 8:
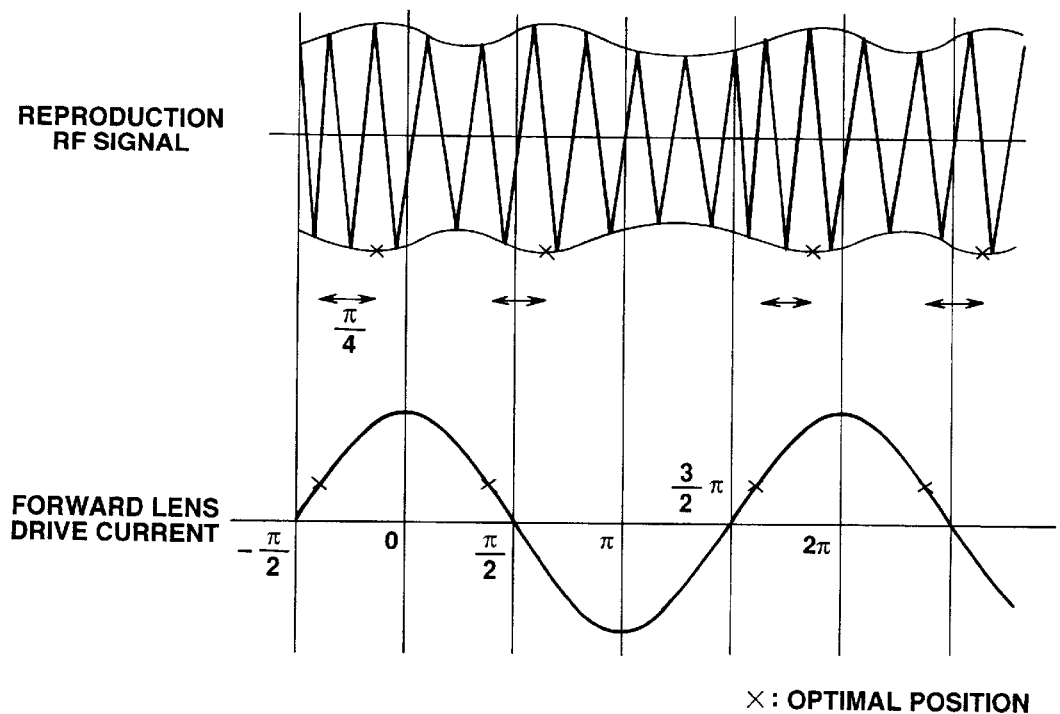
FIG. 8 explains a change of a reproduction RF signal when a jog mode adjustment is carried out to a forward lens.

On the other hand, if it is determined in step S8 that the tracking servo is locked, control is passed to step S11, where the CPU 14 executes a forward lens drive processing. That is, the CPU 14 controls the position control circuit 15 so as to gradually increase from the default value the level of the drive signal supplied via the amplifier 16 to the actuator 74, and again decreases the level after the value has reached the maximum value. After the value has reached the default value, the level of the drive signal is still decreased and, after it has reached the minimum value, the level is again gradually increased up to the default value. Thus, the CPU 14 generates a control signal such as a sawtooth waveform and a sinusoidal waveform. With this control signal, the relative position of the forward lens 28 in relation to the lens 27 is gradually moved apart from the default position and again returns to the default position, after which the forward lens 28 is moved to gradually approach the lens 27 up to a predetermined position and to return to the default position (thus, the position is adjusted in jog mode). As shown in FIG. 8, while the forward lens 28 is driven by a drive current which changes periodically, the level of the RF signal reproduced from the optical disc 1 is changed according to the position of the forward lens 28. When the relative position of the forward lens 28 in relation to the lens 27 has reached the optimal position (with least aberration), the level of the reproduction RF signal becomes the maximum level.

It should be noted that in FIG. 8, the phase of the envelope of the reproduction RF signal is delayed by $\pi/4$ compared to the phase of the drive current, which is caused by the characteristic of the actuator 74. If the change of the drive current is sufficiently slow, this phase delay can be ignored practically.

The RF signal which is the sum of the outputs from the regions A to H of the photo diodes 51, 52, and 53 of the pickup 3 is amplified by the RF head amplifier 12 before being supplied to the envelope detection circuit 13. The envelope detection circuit 13 detects the envelope of this reproduction RF signal and outputs the detection result to the CPU 14. The CPU 14 detects the maximum value of the envelope. After the maximum value is detected, the CPU 14 makes the position control circuit 15 continuously generate the control signal generated when this maximum value was obtained, and makes the RAM 20 store a data corresponding this state.

That is, in step S12, the CPU 14 determines whether the peak of the RF signal has been detected. If the peak is not detected, control is passed to step S13, where it is determined whether a predetermined period of time has passed after the forward lens drive is started. If it is determined that the predetermined period of time has not elapsed, control is returned to step S12 so as to repeat the processes of the steps S12 and S13. In step S13, if the peak of the RF signal is not detected after the predetermined period of time, it is assumed that an error is caused and an error processing is executed in step S14.

On the other hand, if the peak of the RF signal is detected in step S12, control is passed to step S15, where the CPU 14 control the position control circuit 15 so as to make the position control circuit 15 continuously supply the actuator 74 with the position control signal with which the peak of the RF signal can be obtained.

Thus, the optimal focus state is obtained and control is passed to the following steps.

It should be noted that a different type of an optical disc (having a different recording density) may be mounted as the optical disc 1. FIG. 9 and FIG. 10 show the cross-sectional configurations of these different types of optical disc. FIG. 9 shows a first optical disc having a configuration realized, for example, in a DVD. This first optical disc may have a signal recording layer as shown in FIG. 9A or two recording layers as shown in FIG. 9B.

Figure 9A:
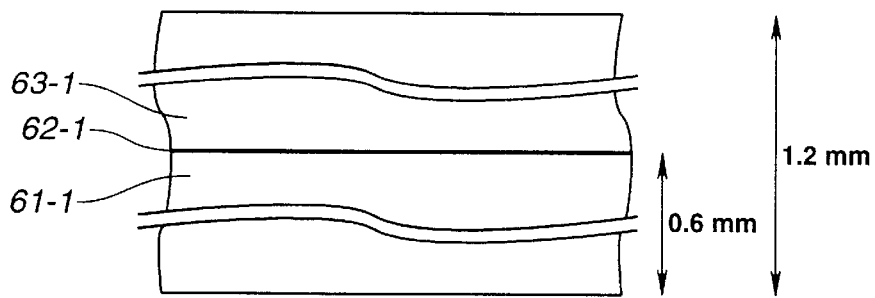
FIG. 9 is a cross-sectional view showing a configuration of a first optical disc.

In the optical disc having the configuration of FIG. 9A, a cover glass 61-1 has a thickness of 0.6 mm, on which a recording layer 62-1 is formed. On this recording layer 62-1 is formed a substrate 63-1. The entire thickness of the disc is made to be 1.2 mm.

Figure 9B:
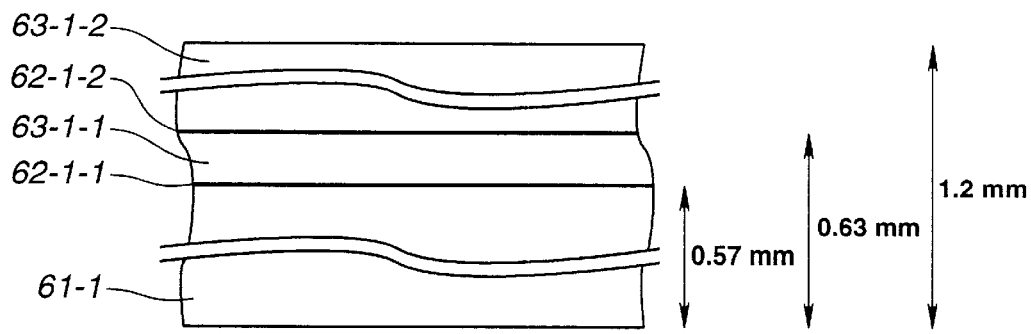

In the optical disc having the configuration of FIG. 9B, a first recording layer 62-1-1 is formed on a cover glass 61-1 having a thickness of about 0.57 mm. On the recording layer 62-1-1 is formed a substrate 63-1-1, on which a second recording layer 62-1-2 is formed. The distance between the first recording layer 62-1-1 and the second recording layer 62-1-2 is about 60 $\mu$m. On the second recording layer 62-1-2 is formed a substrate 63-1-2. The entire thickness of the disc is made to be 1.2 mm which is identical to the disc having a single recording layer.

Figure 10A:
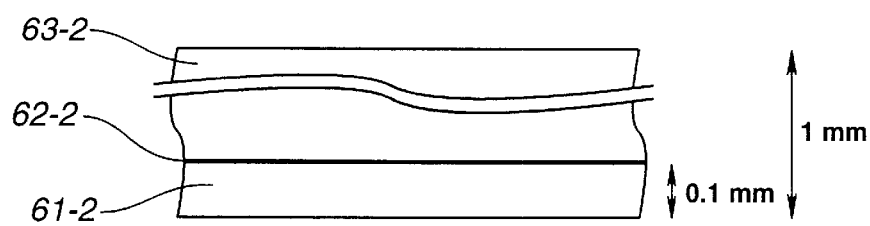
FIG. 10 is a cross-sectional view showing a configuration of a second optical disc.
Figure 10B:
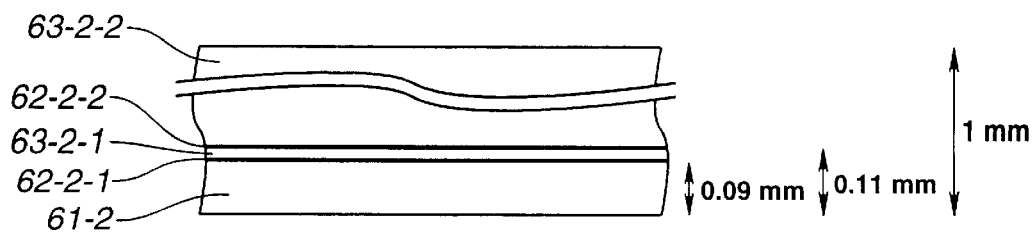

The optical disc as shown in FIG. 10 is a disc on/from which a data can be recorded or reproduced with a higher density. This optical disc also may have a single recording layer as shown in FIG. 10A or two recording layers as shown in FIG. 10B.

In the optical disc having the configuration of FIG. 10A, on a cover glass 61-2 having a thickness of 0.1 mm is formed a recording layer 62-2, on which is formed a substrate 63-2. The entire thickness of the disc is made to be 1 mm.

In the optical disc having the configuration of FIG. 10B, on a cover glass 6102 having the thickness of 0.09 mm is formed a first recording layer 62-2-1, on which is formed a substrate 63-2-2. On this substrate 63-2-1 is formed a second recording layer 62-2-2 so as to be apart from the first recording layer 62-2-1 by 0.02 mm. On the second recording layer 62-2-2 is formed a substrate 63-2-2. The entire thickness of the disc is made to be 1 mm, which is identical to the thickness of the disc having a single recording layer as in FIG. 10A.

Figure 11:
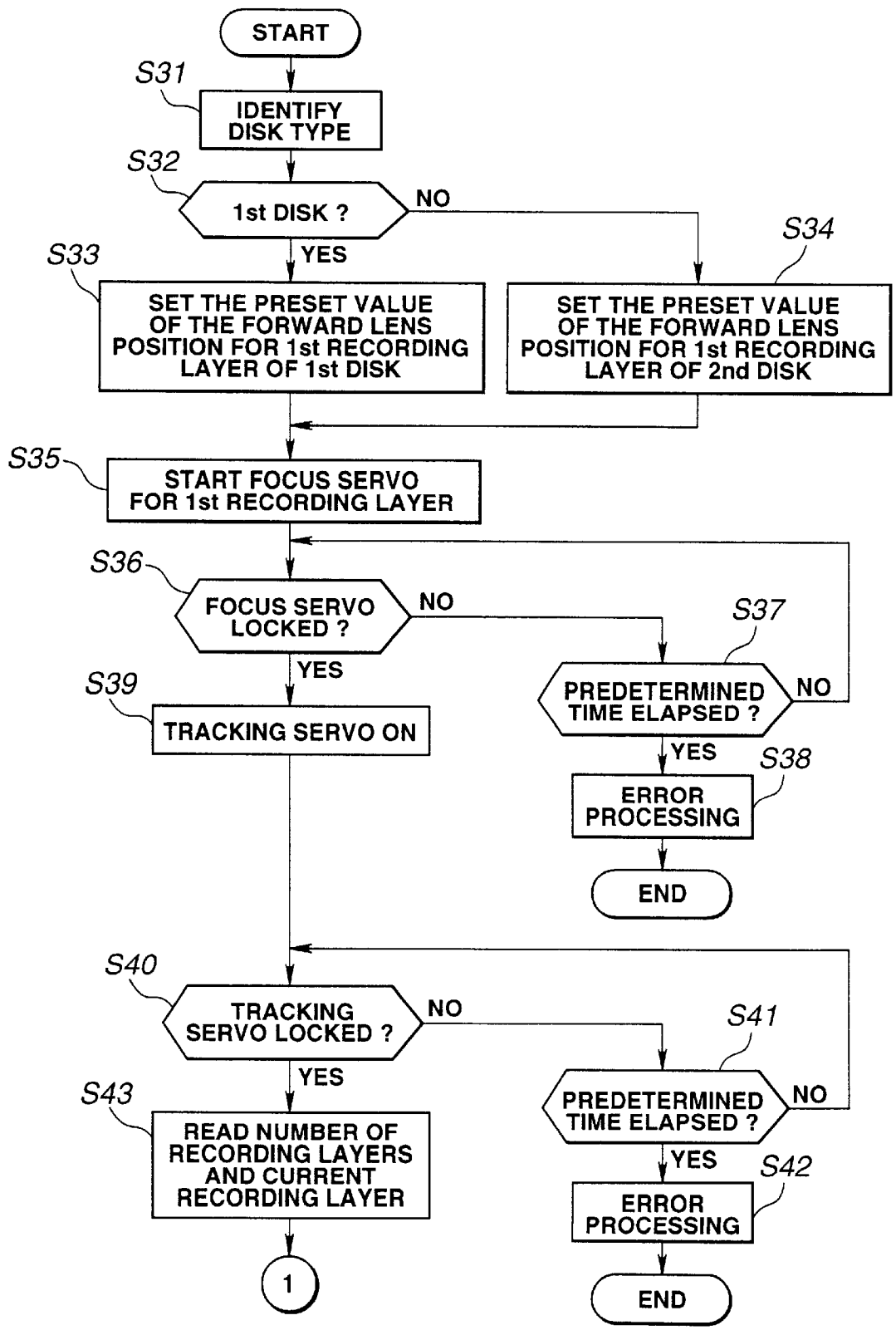
FIG. 11 is a flowchart for explanation of an operation carried out when the optical disc recording/reproduction apparatus of FIG. 1 is started in a case of an optical disc having two recording layers mounted.
Figure 12:
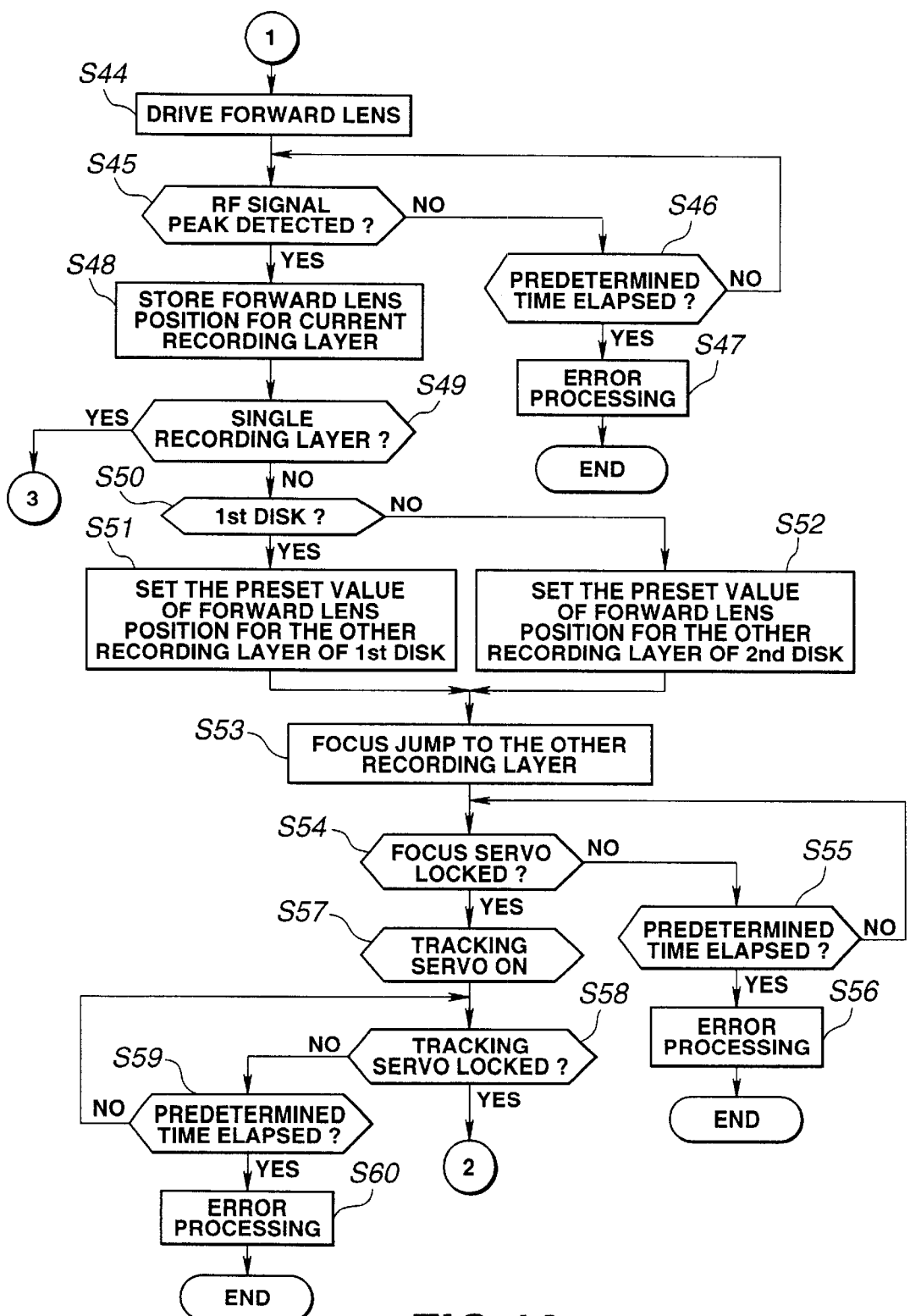
FIG. 12 is a flowchart for explanation of an operation carried out when the optical disc recording/reproduction apparatus of FIG. 1 is started in a case of an optical disc having two recording layers mounted.
Figure 13:
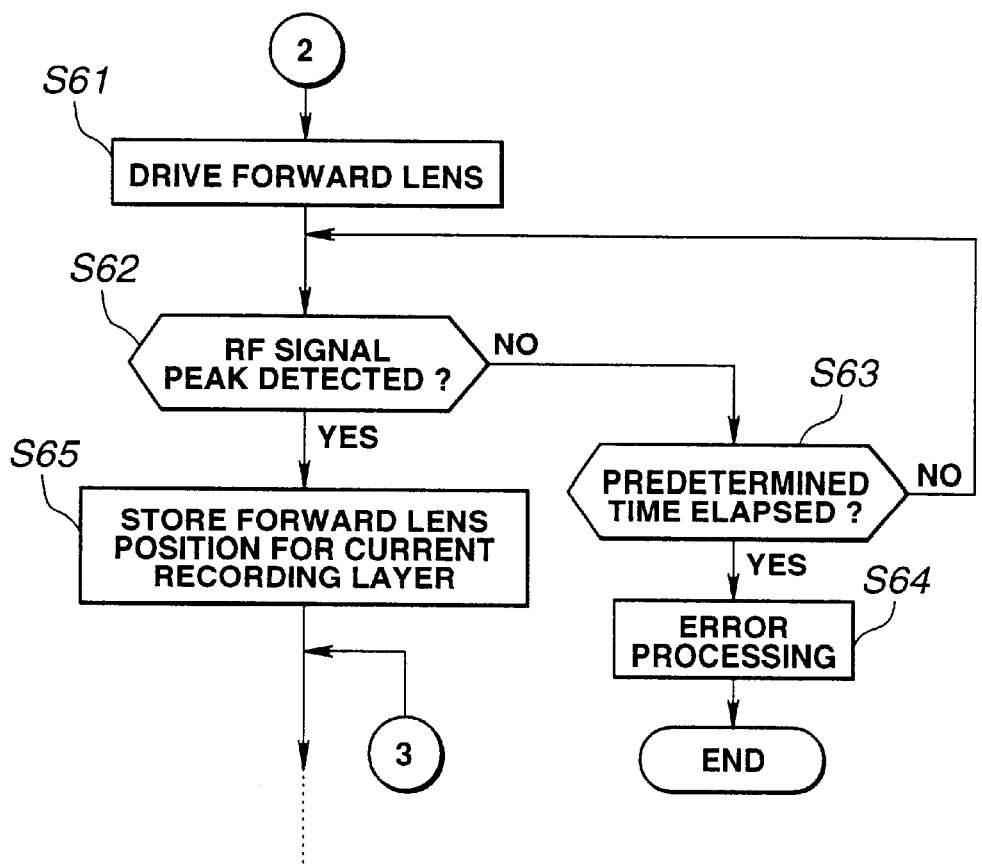
FIG. 13 is a flowchart for explanation of an operation carried out when the optical disc recording/reproduction apparatus of FIG. 1 is started in a case of an optical disc having two recording layers mounted.

Description will now be directed to a start operation of a data recording or reproduction to/from the optical disc of FIG. 9 and the optical disc of FIG. 10 mounted on the optical disc recording/reproduction apparatus shown in FIG. 1, with reference to flowchart of FIG. 11 to FIG. 13. The processing of this flowchart is also started when a disc is mounted.

Firstly, in step S31, a process is executed to identify at type of the disc mounted. That is, when a disc is mounted, the disc sensor 17 detects a thickness of the disc mounted. If the thickness is greater than a reference value, the disc is identified to be the disc of FIG. 9, and if the thickness is smaller than the reference value, the disc is identified to be the disc of FIG. 10. The CPU 14 monitors an output of the disc sensor 17 and determined in step S32 whether the disc mounted is the first disc.

When the first disc is identified, control is passed to step S33, where the CPU 14 sets as a preset value defining the position of the forward lens 28 a default value for the first recording layer 62-1 of the first disc. That is, the CPU 14 contains in its program a value corresponding to a default position of the forward lens 28 which is optimal for reproducing the first recording layer 62-1 for reading a data through the cover glass 61-1 having the thickness of 0.6 mm, and controls the position control circuit 15 so as to generate a control signal corresponding to this value. This control signal is supplied via the amplifier 16 to the actuator 74. As a result, the relative position of the forward lens 28 in relation to the lens 27 in the focus direction is set to the default position.

On the other hand, if it is determined in step S32 that the disc mounted is not the first disc (identified to be the second disc), control is passed to step S34, where the CPU 14 sets a default value corresponding to the first recording layer of the second disc as a preset value for the forward lens 28. That is, in the same way as in step S33, the CPU 14 contains in its program a value corresponding to the default position of forward lens 28 which is optimal for reproducing the first recording layer 62-2 for reading a data through the cover glass having the thickness of 0.1 mm of the second disc, and controls the position control circuit 15 so as to supply a control signal corresponding to this value, via the amplifier 16 to the actuator 74. Thus, the relative position of the forward lens 28 in relation to the lens 27 in the focus direction is set to the default position which is optimal for reading the first recording layer 62-2 of the second disc.

When setting of the default value is complete in step S33 or step S34, control is passed to step S35, where the CPU 14 executes for starting the focus servo so as to focus on the first recording layer of the disc mounted. In step S36, it is determined whether the focus servo is locked. If the focus servo is not locked, control is passed to step S37, where it is determined whether a predetermined period of time has elapsed after the focus servo is started. If the predetermined period of time has not elapsed, control is returned to step S36 so as to repeat the processes of steps S36 and S37. If it is determined in step S37 that the focus servo is not locked after the predetermined period of time has elapsed, control is passed to step S38, assuming that an error is caused, and an error processing is executed.

Thus, if the focus servo is carried out for the first recording layer of the two recording layers, the focus servo can surely be locked because the first recording layer is within a range of the focus servo withdrawal regardless of the disc mounted has a single recording layer or two recording layers. As will be explained later, in step S43, a data indicating the number of the recording layers and the current recording layer is read from the recording layer where the focus servo is locked.

On the contrary, it is also possible to firstly access to the second recording layer.

Figure 14:
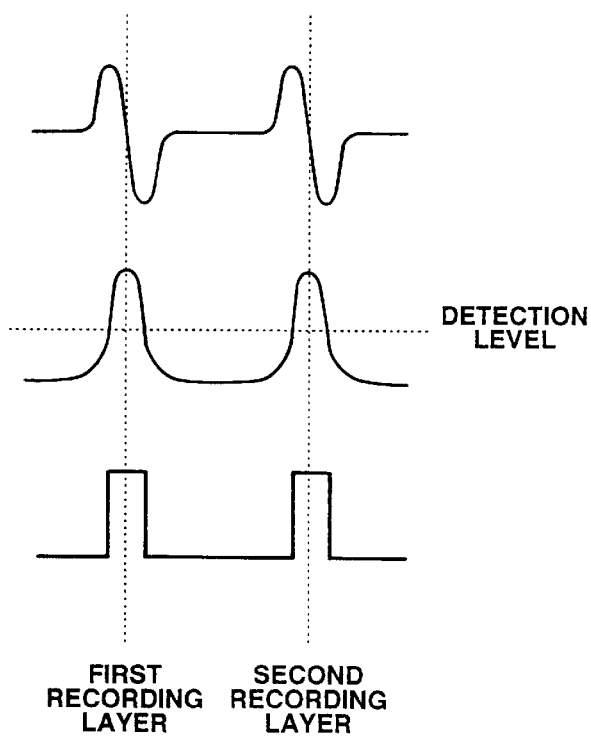
FIG. 14 shows a signal waveform when the focus servo is actuated for an optical disc having two recording layers/

In step S35, the focus servo is started for the second recording layer. In this case, the focus servo is started for the second recording layer after passing through the first recording layer, the focus error signal twice generates an S-shaped curve in the first recording layer and in the second recording layer as shown in FIG. 14A. The signal SUM also shows two peaks as shown in FIG. 14B. As a result, as shown in FIG. 14C, the gate signal to turn on the focus servo is also generated twice. The CPU 14 turns on the loop switch 18 corresponding to the second gate signal when focusing for the second recording layer.

Thus, in a case when the second recording layer is accessed first, the focus servo cannot be locked in if the disc mounted has a single recording layer. Consequently, in this case, it is possible that in step S37, the disc mounted is identified as a disc having a single recording layer if the focus servo is not locked after a predetermined period of time has elapsed. However, in this case, it is difficult to distinguish a case when the focus servo is not locked in because of an error. Therefore, it is preferable to firstly focus on the first recording layer.

If it is determined in step S36, that the focus servo is locked, control is passed to step S39, where the CPU 14 turns on the tracking servo, and control is passed to step S40, where it is determined whether the tracking servo is locked. If the tracking servo is not locked, control is passed to step S41, where it is determined whether a predetermined period of time has elapsed after the tracking servo is turned on. If the predetermined period of time has not elapsed, control is returned to step S40 to repeat the processes of steps S40 and S41. If it is determined in step S41 that the predetermined period of time has elapsed, it is assumed than an error is caused and control is passed to step S42 for executing an error processing. The processes of steps S39 to S42 are identical to steps S7 to S10 of FIG. 6.

If step S40 determines that the tracking servo is locked, control is passed to step S43, where the CPU 14 executes a process for reading a data indicating the number of the recording layers and the currently reproduced layer, from the first recording layer 62-1, 62-1-1 of the first optical disc or from the first recording layer 62-2, 62-2-1 of the second optical disc. That is, each of the recording layers contains: an identification code indicating whether the disc is a first disc or a second disc; an identification code indicating whether the disc has a single recording layer or two recording layers; and an identification code indicating whether the first recording layer or the second recording layer is being reproduced. The CPU 14 monitors the reproduction RF signal outputted from the RF head amplifier 12 and reads these identification codes.

Next, control is passed to step S44, where the CPU 14 generates a control signal for moving the forward lens 28 apart from the lens 27 and again toward the lens 27 while maintaining the loop switch 18 ON. This control signal is supplied via the adder 7 and amplifier 9 to the actuator 74. In step S45, by monitoring the output of the envelope detection circuit 13, it is determined whether the peak of the RF signal has been detected. If the peak is not detected, control is passed to step S46, where it is determined whether a predetermined period of time has elapsed after the forward lens drive is started. If the predetermined period of time is not elapsed, control is returned to step S45. If it is determined that the predetermined period of time has elapsed, control is passed from step S46 to step S47, assuming that an error is caused, and an error processing is executed. The processes of steps S44 to S47 are identical to the processes of steps S11 to S14 explained with reference to FIG. 6.

On the other hand, if it is determined in step S45 that the peak of the RF signal is detected, control is passed to step S48, where the CPU 14 makes the RAM 2 store a data corresponding to the current position of the forward lens 28 as an optimal position data of the forward lens 28 for the recording layer. Thus, the RAM 20 stores the data corresponding to the optimal position of the forward lens 28 when accessing to the first recording layer.

Next, control is passed to step S49, where the CPU 14 determines whether the currently mounted optical disc 1 has a single recording layer according the data read in step S43. If the number of the recording layers is one, control is passed to a normal processing such as recording and reproduction.

On the other hand, if it is determined in step S49 that the number of the recording layers is not one (two), control is passed to step S50, where it is determined whether the disc currently mounted is a first disc. If it is determined that the disc currently mounted is a first disc, control is passed from step S50 to step S51, where the CPU 14 executes a processing to set the position of the forward lens 28 to a value for the other recording layer (a recording layer different from the currently positioned recording layer) of the first disc. Moreover, if it is determined in step S50 that the currently mounted disc is not a first disc (second disc), control is passed to step S52, where a processing is executed to set the position of the forward lens 28 to a value for the remaining recording layer (a recording layer different from the current recording layer) of the second disc. That is, the program operating the CPU 14 contains, as in the same way as the steps S33 and S34, the default position corresponding to the other recording layer 62-1-2 of the first disc of FIG. 9 as well as the value corresponding to the default position of the second recording layer 62-2-2 of the second disc of FIG. 10. The CPU 14 reads out the default values in steps S51 and S52 and controls the position control circuit 15 so as to output a control signal in accordance with the default value.

When the setting process in step S51 or S52 is complete, control is passed to step S53, where the CPU 14 makes to execute a focus jump to the recording layer which has been set. For this, the CPU 14 temporarily turns off the loop switch 18 and outputs a jump pulse to the adder 7 so as to execute a focus jump from the first recording layer to the second recording layer. This jump pulse is supplied via the amplifier 8 to the actuator 72. With this, the two lens as a unitary block carry out a focus jump from the first recording layer to the second recording layer.

Next, in step S54, it is determined whether the focus servo is locked. If the focus servo is not locked, control is passed to step S55, where it is determined whether a predetermined period of time has elapsed after the focus jump. If the predetermined period of time has not elapsed, control is returned to step S54. If it is determined that the predetermined period of time has elapsed, control is passed from S55 to S56 for executing an error processing.

If it is determined in step S54 that the focus servo is locked, control is passed to step S57, where the CPU 14 turns on the tracking servo, and control is passed to step S58, where it is determined whether the tracking servo is locked. If the tracking servo is not locked, control is passed to step S59, where it is determined whether a predetermined period of time for the tracking servo ON has elapsed. If the predetermined period of time has not elapsed, control is returned to step S58. If it is determined in step S59 that the predetermined period of time has elapsed, control is passed to step S60 for executing an error processing.

When the tracking servo is locked, control is passed to step S61, where a processing (jog mode adjustment) is executed to drive the forward lens. In step S62, it is determined whether the peak of the RF signal is detected. If the peak is not detected, control is passed to step S63, where it is determined whether a predetermined period of time has elapsed, If the predetermined period of time has not elapsed, control is returned to step S62. If it is determined that the predetermined time has elapsed, control is passed from step S63 to step S64 for executing an error processing. If it is determined in step S62 that the peak of the RF signal is detected, control is passed to step S65, where the RAM 20 stores a data corresponding to the position of the forward lens for the second recording layer. After this, a processing such as recording and reproduction is executed.

Note that processes of the steps S54 to S65 are substantially identical to the processes of the steps S36 to S48 for the first recording layer.

Thus, in a case when the optimal position of the forward lens 28 is obtained successively for the first recording layer and the second recording layer of the optical disc in this order, the recording layer at the moment when the processing for obtaining the optimal value is complete is the second recording layer. Normally, a data is recorded or reproduced, starting at the first recording layer to be continued to the second recording layer. Consequently, in the stand-by state upon completion of the start, it is preferable that focusing is set for the first recording layer. Therefore, in this case, it is possible that after the optimal value is obtained for the second recording layer, a focus jump is executed to the first recording layer before entering the stand-by state.

As has been described above, in a case when the optimal position is obtained for the first recording layer after the optimal position for the second recording layer is obtained, the pickup 3 is positioned on the first recording layer when the processing to obtain the optimal position is complete, enabling to immediately enter a recording or reproducing operation.

Figure 15:
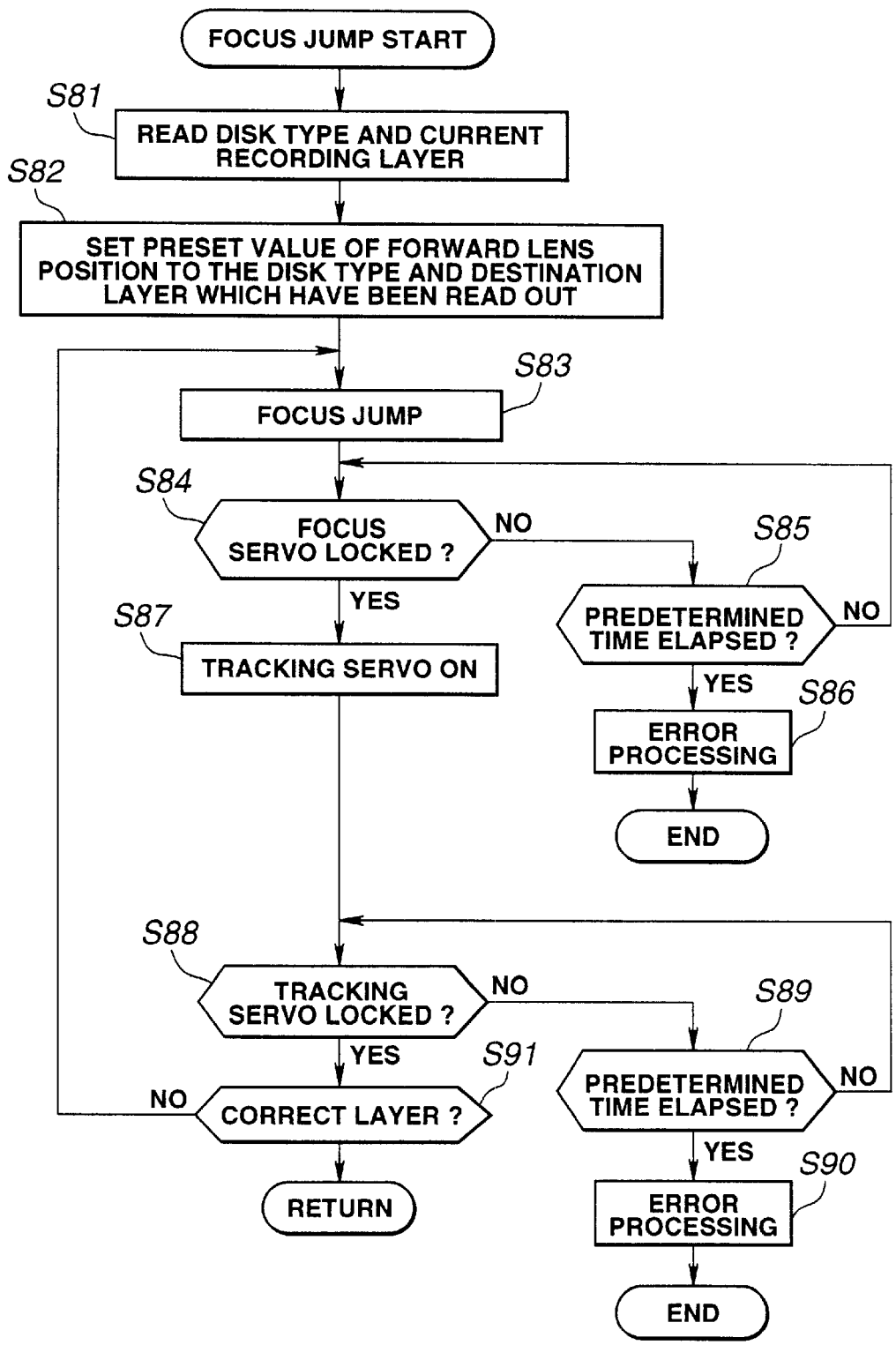
FIG. 15 is a flowchart explaining an operation of focus jump.

After the RAM 20 stores the optimal positions of the forward lens 28 for the respective recording layers, the CPU 14 executes a processing shown in a flowchart of FIG. 15 when executing a focus jump from the first recording layer to the second recording layer or from the second recording layer to the first recording layer during a recording or a reproduction operation.

That is, firstly in step S81, the CPU 14 reads the disc type and the current recording layer. The disc type has been stored in the RAM 20 in step S31 when the disc is mounted and the disc type is identified. The current recording layer is stored in the RAM 20 when a current recording layer is checked in step S91 which will be explained later, each time when executing a focus jump.

Next, control is passed to step S82, where the position of the forward lens 28 is set for the values of the disc type and the recording layer of the jump destination which have been read in step S81. If the disc currently mounted is the first disc and the jump destination is the first recording layer 62-1-1, the CPU 14 reads from the RAM 20 a data corresponding to the optimal position of the forward lens 28 obtained when accessing this first recording layer, and the data is supplied to the position control circuit 15. Similarly, if the jump destination is the second recording layer 62-1-2, the CPU reads from the RAM 20 a data of the corresponding position of the forward lens 28, and the data is supplied to the position control circuit 15. Similarly, in a case when the disc currently mounted is the second disc and the jump destination is the first recording layer 62-2-1, a corresponding data is read from the RAM 20 and supplied to the position control circuit 15. If the jump destination is the second recording layer 62-2-2, a corresponding data is read from the RAM 20 and supplied to the position control circuit 15.

As has been described above, the position of the forward lens 28 is set to the optimal position for the jump destination, and control is passed to step S83, where the CPU 14 makes to execute a focus jump. In step S84, it is determined whether the focus servo is locked. If not locked, control is passed to step S85, where it is determined whether a predetermined period of time has elapsed after the focus jump. If the predetermined period of time has not elapsed, control is returned to step S84. If it is determined in step S85 that the predetermined period of time has elapsed, it is assumed that an error is caused and control is passed to step S86 for executing an error processing.

On the other hand, if it is determined in step S84 that the focus servo is locked, control is passed to step S87, where the CPU 14 turns on the tracking servo. In step S88, it is determined whether the tracking servo is locked. If not locked, control is passed to step S89, where it is determined whether a predetermined period of time has elapsed. If the predetermined period of time has not elapsed, control is returned to step S88. If it is determined in step S89 that the predetermined period of time has elapsed, control is passed to step S90 for executing an error processing.

If it is determined in step S88 that the tracking servo is locked, control is passed to step S91, where the CPU 14 reads a reproduction RF signal supplied from the RF head amplifier 12 and determines whether the currently positioned recording layer is the jump destination. If the recording layer is determined not to be the jump destination, control is returned to step S83 for executing a focus jump to the destination. If it is determined in step S91 that the recording layer after the jump is the recording layer specified as the jump destination, the focus jump processing is complete.

In the above embodiment, explanation was given in the case when the optical disc a single recording layer or two recording layers. However, the present invention can be applied to a case when the optical disc has three or more recording layers. Moreover, the present invention can be applied to a case when three or more types of optical disc are used.

What is claimed is:

1. An optical disc recording/reproduction apparatus for recording or reproducing a data by applying a beam to an optical disc via a lens group consisting of at least a first lens and a second lens, said apparatus comprising:
   first drive means for simultaneously moving both of said first lens and said second lens in a focusing direction;
   second drive means for moving said second lens relative to said first lens in the focusing direction;
   focus servo means for carrying out focus servo by moving said first drive means so as to drive both of said first lens and said second lens in the focusing direction; and
   jog mode adjustment means for driving said second drive means after said focus servo is locked, so as to carry out a jog mode adjustment of the position of said second lens with respect to said first lens.

2. An optical disc recording/reproduction apparatus as claimed in claim 1, wherein said second lens is arranged so as to oppose said optical disc.

3. An optical disc recording/reproduction apparatus as claimed in claim 1, said apparatus further comprising detection means for detecting a position of said second lens position with respect to said first lens during said jog mode adjustment.

4. An optical disc recording/reproduction apparatus as claimed in claim 3, wherein said detection means detects a level of a signal obtained by reproduction of said optical disc during said jog mode adjustment.

5. An optical disc recording/reproduction apparatus as claimed in claim 4, wherein said signal detected by said detection means is an RF signal or a servo signal.

6. An optical disc recording/reproduction apparatus as claimed in claim 3, wherein said detection means detects a jitter value during said jog mode adjustment.

7. An optical disc recording/reproduction apparatus as claimed in claim 3, said apparatus further comprising tracking servo means for tracking said lens group, wherein
   said detection means detects a position of said second lens with respect to said first lens in a state when said tracking servo is locked.

8. An optical disc recording/reproduction apparatus as claimed in claim 1, wherein said focus servo means carries out a focus servo by setting in advance for said second drive means a value corresponding to a predetermined position of said second lens with respect to said first lens.

9. An optical disc recording/reproduction apparatus as claimed in claim 1, wherein said jog mode adjustment means adjusts in jog mode a position of said second lens when said optical disc is mounted.

10. An optical disc recording/reproduction apparatus as claimed in claim 1, said apparatus further comprising identification means for identifying a type of said disc.

11. An optical disc recording/reproduction apparatus as claimed in claim 1, wherein said optical disc has a plurality of recording layers and said jog mode adjustment means adjusts in jog mode a position of said second lens with respect to said first lens for each of said recording layers.

12. An optical disc recording/reproduction apparatus as claimed in claim 11, wherein said focus servo means carries out a focus jump for detecting a second recording layer after detecting a first recording layer of said plurality of recording layers, and
   said jog mode adjustment means, at said focus jump, sets said second lens at a default position of a recording layer of a jump destination with respect to said first lens.

13. An optical disc recording/reproduction apparatus as claimed in claim 11, said apparatus further comprising memory means for storing a position of said second lens with respect to said first lens after said jog mode adjustment for each of said recording layers.

14. An optical disc recording/reproduction apparatus for recording or reproducing a data by applying a beam onto an optical disc via a lens group consisting of at least a first lens and a second lens, said method comprising:
   a focus servo step of simultaneously moving both of said first lens and said second lens in a focusing direction for carrying out a focus servo; and
   a jog mode adjustment step, after said focus servo is locked, for carrying out a jog mode adjustment of a position of said second lens with respect to said first lens without moving said first lens.

15. An optical disc recording/reproduction apparatus as described in claim 11, wherein said lens group has a Numerical Aperture (NA) of at least 8.

16. An optical disc recording/reproduction apparatus as described in claim 1, wherein both first and second lenses are convex lenses.

* * * * *